(12) United States Patent
Lagrange et al.

(10) Patent No.: US 10,873,472 B2
(45) Date of Patent: Dec. 22, 2020

(54) METHOD AND DEVICE FOR RESETTING AT LEAST ONE PROCESSING DEVICE

(71) Applicant: CANON KABUSHIKI KAISHA, Tokyo (JP)

(72) Inventors: Pascal Lagrange, La Chapelle des Fougeretz (FR); Hervé Merlet, Servon sur Vilaine (FR)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 16/213,168

(22) Filed: Dec. 7, 2018

(65) Prior Publication Data

US 2019/0199538 A1 Jun. 27, 2019

(30) Foreign Application Priority Data

Dec. 21, 2017 (GB) .................................. 1721578.1

(51) Int. Cl.
| | |
|---|---|
| *G06F 11/00* | (2006.01) |
| *H04L 12/12* | (2006.01) |
| *H04L 12/10* | (2006.01) |
| *G06F 1/24* | (2006.01) |
| *H04N 5/232* | (2006.01) |
| *H04N 7/18* | (2006.01) |
| *H04N 17/00* | (2006.01) |
| *H04N 5/268* | (2006.01) |

(52) U.S. Cl.
CPC ................ *H04L 12/12* (2013.01); *G06F 1/24* (2013.01); *H04L 12/10* (2013.01); *H04N 5/23241* (2013.01); *H04N 7/181* (2013.01); *H04N 17/002* (2013.01); *H04N 5/268* (2013.01)

(58) Field of Classification Search
CPC ......... H04L 12/40169; H04L 12/40176; H04L 12/40182; H04L 12/40189; H04L 12/40195; H04L 12/40202; G06F 11/1441
USPC .......................................................... 714/4.5
See application file for complete search history.

(56) References Cited

U.S. PATENT DOCUMENTS

| | | | |
|---|---|---|---|
| 5,655,083 A | 8/1997 | Bagley | |
| 2003/0233595 A1* | 12/2003 | Charny | H04L 45/50 714/4.1 |
| 2005/0226086 A1* | 10/2005 | Sugawara | G11C 8/14 365/230.05 |
| 2009/0249112 A1 | 10/2009 | Diab | |
| 2009/0312007 A1* | 12/2009 | Kallio | H04W 76/19 455/422.1 |

(Continued)

FOREIGN PATENT DOCUMENTS

JP H09-319467 A 12/1997

*Primary Examiner* — Sarai E Butler
(74) *Attorney, Agent, or Firm* — Canon U.S.A., Inc. IP Division

(57) ABSTRACT

A method for resetting at least one processing device in a power-over-data linear bus interconnecting a plurality of processing devices, the method including, at a first processing device of said plurality of processing devices: sending a protocol data unit comprising a prior-reset notification to all other processing devices of the plurality of processing devices, and sending a physical reset signal to all other processing devices of the plurality of processing devices, wherein the prior-reset notification is configured to prevent a processing device that receives the physical reset signal from resetting, if the protocol data unit comprising the prior-reset notification has been previously processed by the processing device.

17 Claims, 13 Drawing Sheets

(56) References Cited

U.S. PATENT DOCUMENTS

| | | |
|---|---|---|
| 2010/0257348 A1 | 10/2010 | Sovela et al. |
| 2012/0079328 A1* | 3/2012 | Sawaguchi ......... G06F 11/0721 |
| | | 714/47.1 |
| 2014/0354812 A1* | 12/2014 | Schafer ............... B60R 11/0235 |
| | | 348/148 |
| 2015/0205683 A1* | 7/2015 | Chen ................... G06F 11/1469 |
| | | 714/4.11 |
| 2015/0234711 A1* | 8/2015 | Yamaguchi ......... G06F 11/3058 |
| | | 714/47.1 |
| 2017/0153898 A1* | 6/2017 | Hayashi .............. G06F 11/1441 |
| 2017/0302508 A1* | 10/2017 | Kim ...................... H04L 61/103 |

* cited by examiner

METHOD AND DEVICE FOR RESETTING AT LEAST ONE PROCESSING DEVICE

CROSS-REFERENCE TO RELATED APPLICATION

This application claims the benefit under 35 U.S.C. § 119(a)-(d) of United Kingdom Patent Application No. 1721578.1 filed on Dec. 21, 2017 and entitled "Method and device for resetting at least one processing device". The above cited patent application is incorporated herein by reference in its entirety.

FIELD OF THE INVENTION

The present invention relates to the field of communication networks, and in particular to digital video surveillance networks.

More particularly, the present invention relates to a method and a device for selectively resetting a processing device in a power-over-data network.

BACKGROUND OF THE INVENTION

A typical digital video surveillance system comprises at least two types of wire networks, a first type of wire network for data transport, and a second type of wire network for power distribution to digital cameras in the system.

It may be useful, for example for cost saving purpose, to use a same wired infrastructure to distribute both data and power.

"Power over Ethernet" (PoE) technology allows both data and power to be carried over a same wire, therefore allowing power distribution and Ethernet data to be mixed on a same wire.

It is advantageous, especially in terms of costs saving, to build a new digital camera surveillance infrastructure by reusing existing LAN wires that are able to support power distribution. In this respect, the infrastructure of an analogue camera surveillance system may be upgraded in order to build a digital video surveillance system.

An analogue video surveillance system connecting analogue cameras to a central point, using for example coaxial cables, may thus be upgraded or retrofitted in order to build a digital camera surveillance system by replacing analogue cameras with digital network cameras (e.g. IP cameras) and by inserting an adapter, both at the central point and at each digital camera, the analogue cable infrastructure being reused.

The adapter in the central point converts data originating from the Ethernet infrastructure to data adapted to be transported over the coaxial cables, referred to as "IP Coax Traffic", and sends it to the digital cameras, referred as "IP Coax cameras"; converts data originating from digital cameras to data adapted to be transported by the Ethernet infrastructure ("Ethernet Traffic") and sends it to the LAN, and provides power to the IP cameras over the coaxial cables.

The adapter in the camera ("Coax terminal adapter") is connected to an Ethernet port of the camera. The "Coax terminal adapter" converts IP Coax traffic originating from the Coaxial cable to Ethernet traffic and sends it to the camera, converts Ethernet traffic originating from the camera to IP Coax Traffic and sends it to the Coaxial cable, and receives power from the Coaxial cable and delivers it to the camera through the Ethernet port.

In these technologies, the Coax terminal adapter comprises a power management module configured for managing the power distribution to the camera. In particular, the power management module is configured for delivering power to the IP camera according to standards for power transport over Ethernet known as PoE (IEEE802.3af) or PoE+ (IEEE802.3at).

An IP camera or a Coax terminal adapter may experience software or firmware problems, which may require the device to be rebooted or reset, i.e. turning off its supply originating from a power source.

Typically, in case of a problem the software run by the microcontroller chipset on the apparatus is unresponsive or is not behaving the way it should normally operate. In such case, a reset of the device apparatus should be performed in order to close the stalled software application or applications and clear any related data currently stored in the RAM (random access memory) used by the microcontroller chipset.

This is typically done by restarting the device using an appropriate software command, in case the device apparatus is still capable of processing such a command, or by powering the device apparatus off and powering it back on in case it is no longer capable of processing such a command.

In a system functioning according to standards PoE or PoE+, IP cameras are connected on respective ports of a switch apparatus, according to a star topology. In such a case, a camera may be reset by turning the power off on the particular port where the device to be reset is connected.

Thus, a selective power reset of a device is performed by a Power Sourcing Equipment.

However, when several devices are connected to a same switch port through a linear bus topology, it is no longer possible to perform a selective device reset, since turning the power off on a switch port would lead to resetting all the devices connected to this port.

SUMMARY OF THE INVENTION

The present invention is directed to providing a method and an apparatus for rebooting or resetting a device in a linear bus topology without rebooting all the devices connected to the linear bus, i.e. for performing a selective reboot of a device in a linear bus topology.

To that end, according to a first aspect, the present invention concerns a method for resetting at least one processing device connected to a power-over-data linear bus interconnecting a plurality of processing devices.

The method comprises, at a first processing device of said plurality of processing devices:
sending a protocol data unit comprising a prior-reset notification to all other processing devices of the plurality of processing devices, and
sending a physical reset signal to all other processing devices of the plurality of processing devices,
wherein the prior-reset notification is configured to prevent a processing device that receives the physical reset signal from resetting, if the protocol data unit comprising the prior-reset notification has been previously processed by the processing device.

Thus, processing devices that are able to process a received protocol data unit (i.e. to perform instructions according to the prior-reset notification) are immunized against a physical reset signal received later. In addition, these processing devices having interpreted the prior-reset notification are informed that a selective reset process is about to happen.

Processing devices that were not able to perform instructions according to the prior-reset notification are reset when receiving a physical reset signal.

In other words, at each processing device of the plurality of processing devices:
- when a protocol data unit originating from the first processing device is processed, the processing device is able to avoid performing a reset on receiving a physical reset signal
- when a protocol data unit originating from the first processing device is not processed, the processing device resets on receiving a physical reset signal.

Thus, a processing device of a plurality of processing devices is reset according to a selective reset process commanded by a first processing device belonging to the plurality of processing devices. As a consequence, the first processing device is a processing device in charge of performing a selective reset process.

According to a feature, the method for resetting at least a processing device comprises checking the status of each of the processing devices of the plurality of processing devices, the status being either a normally functioning status or a faulty status, and when at least a processing device is verified as having a faulty status, selecting the first processing device.

Thus, when a processing device is identified as having a faulty status, a first processing device is selected from among the processing devices of the plurality of processing devices in order to perform the selective reset process.

According to an embodiment, the first processing device is selected from among the processing devices that are directly connected to one processing device verified as having a faulty status.

According to an embodiment, the first processing device is selected as being the closest processing device connected to one processing device verified as having a faulty status.

According to an embodiment, the method for resetting at least a processing device further comprises the first processing device receiving from a central controlling device a request to send said protocol data unit comprising a prior-reset notification.

Thus, a central controlling device requests the selected first processing device to send the protocol data unit (or message) comprising a prior-reset notification to all processing devices.

According to another embodiment, the selected first processing device itself decides to send said protocol data unit comprising a prior-reset notification.

According to an embodiment, a protocol data unit comprises a Medium Access Control (MAC) level reset notification.

According to an embodiment, for a processing device that has processed said protocol data unit, the method comprises deactivating a local reset circuit on receiving a physical reset signal.

Thus, a processing device deactivates a local reset circuit on receiving a physical reset signal, the local reset circuit being configured for cutting a power supply to the processing device.

As a consequence, for a processing device that has been immunized against reset, the local reset circuit cutting the power supply to the processing device is deactivated. Therefore, by virtue of the immunization, the power supply cut is not implemented.

According to another embodiment, for a processing device that has processed said protocol data unit, the method comprises activating a capacitive circuit on receiving a physical reset signal.

Thus, a processing device activates a capacitive circuit on receiving a physical reset signal, the capacitive circuits allowing a power supply to be maintained at a predefined voltage level even though a power supply cut occurs on receiving a physical reset signal.

As a consequence, for a processing device that has been immunized against reset, the power supply is maintained at the predefined voltage level even though a power supply cut occurs. Therefore, by virtue of the immunization, the processing device is not powered off.

According to a second aspect, the present invention concerns a system comprising a plurality of processing devices interconnected by a power-over-data linear bus, wherein a first processing device of said plurality of processing devices comprises:
- means for sending a protocol data unit comprising a prior-reset notification to all other processing devices of the plurality of processing devices, and
- means for sending a physical reset signal to all other processing devices of the plurality of processing devices, wherein the prior-reset notification is configured to prevent a processing device that receives the physical reset signal from resetting, if the protocol data unit comprising the prior-reset notification has been previously processed by the processing device.

According to a feature, the system comprises means for checking the status of each of the processing devices of the plurality of processing device, the status being either a normally functioning status or a faulty status, and means for selecting the first processing device, when at least a processing device is verified as having faulty status.

According to a feature, means for selecting are configured for selecting the first processing device from among the processing devices that are directly connected to one processing device verified as having a faulty status.

According to a feature, means for selecting are configured for selecting the first processing device as being the closest processing device connected to one processing device verified as having a faulty status.

According to a feature, the first processing device comprises means for receiving from a central controlling device, a request to send said protocol data unit comprising a prior-reset notification.

According to a feature, a processing device that has been processed said protocol data unit comprises means for deactivating a local reset circuit on receiving a physical reset signal.

According to a feature, a processing device that has been processed said protocol data unit comprises means for activating a capacitive circuit on receiving a physical reset signal.

According to a feature, the first processing device is one of a Power sourcing equipment (PSE), a video monitoring system (VMS), a camera device and adapter device.

According to a third aspect, the present invention concerns a computer program product which can be loaded into a programmable apparatus, comprising a sequence of instructions for implementing a method for resetting at least a processing device according to the invention when said computer program product is loaded into and executed by said programmable apparatus.

According to a fourth aspect, the present invention concerns a computer-readable data carrier having stored thereon the computer program product of the invention.

The objects according to the second, third and fourth aspects of the invention provide at least the same advantages as those provided by the method for resetting at least one processing device according to the first aspect.

BRIEF DESCRIPTION OF THE DRAWINGS

Still other particularities and advantages of the invention will appear in the following description, made with reference to the accompanying drawings, which are given by way of non-limiting example, and in which:

FIG. 3a represents a functional block diagram of a power management module of a terminal adapter according to the first embodiment represented by FIG. 2a;

DETAILED DESCRIPTION OF THE INVENTION

Figure 1:
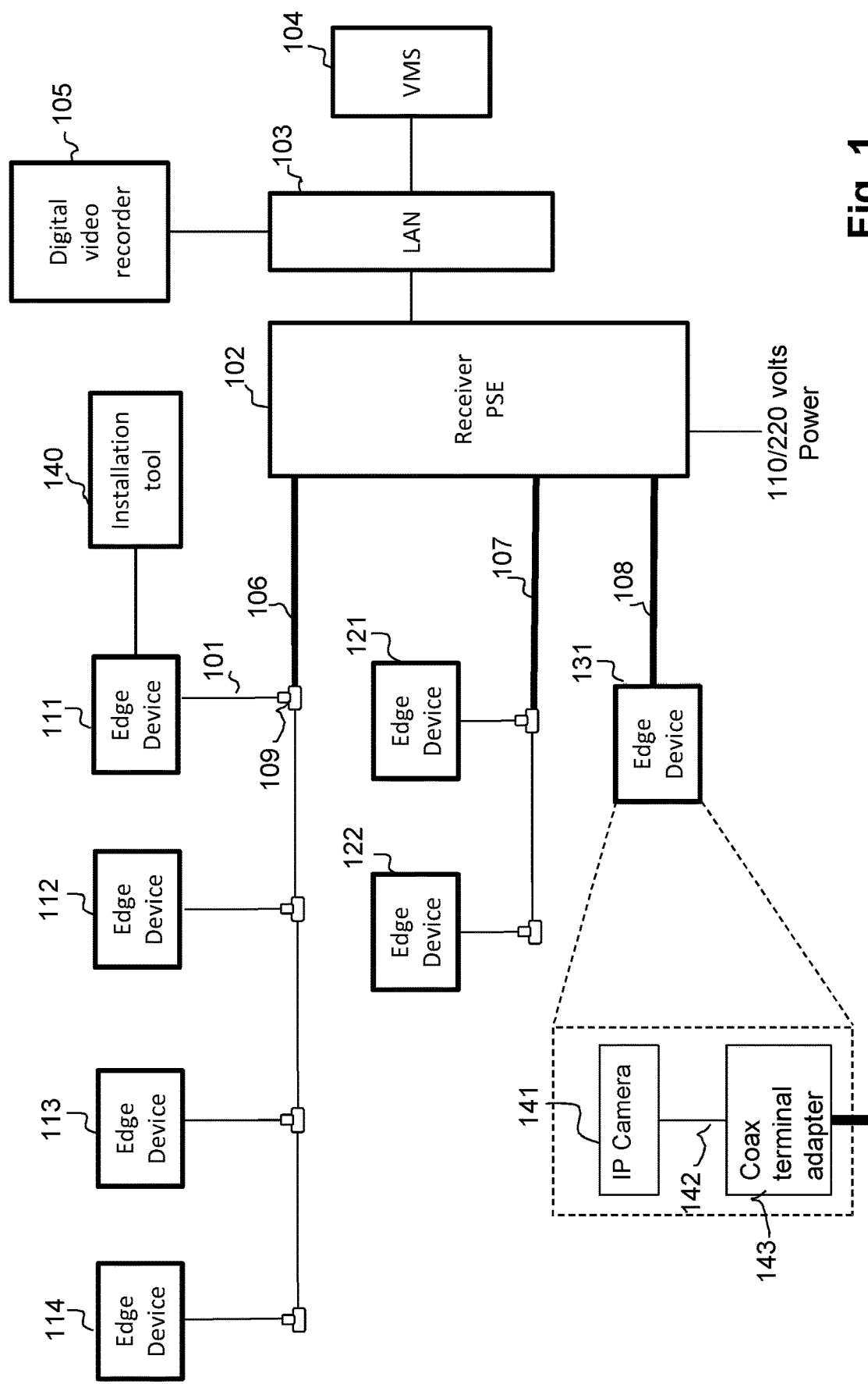
FIG. 1 illustrates a typical video surveillance system in which the invention may be implemented.

FIG. 1 schematically illustrates an IP over Coax video surveillance system according to embodiments. In particular, FIG. 1 represents a general retrofitted digital video surveillance system according to an embodiment. For example, the retrofitted digital video surveillance system is an analogue video surveillance system that has been upgraded to transport IP (Internet Protocol) data. The analogue cameras of the analogue video surveillance system have been replaced by IP cameras. However, the wire infrastructure is kept. The wire infrastructure comprises cables 106, 107, 108 connecting a central point of the system infrastructure 102 and the cameras 111, 121 and 131.

It may be noted that cables 106, 107 and 108 were used in the previous analogue system to transport analogue video signals. In the retrofitted system these cables 106, 107, 108 are used to transport IP video, control data and power supply. These cables are typically as long as required. In the described example, these cables 106, 107, 108 are coaxial cables and may be for example 300 meters long. However, a different type of cables adapted to the transport of video signals and of some other length may be used.

At a central point 102 of the system infrastructure, an item of equipment called "Head-end adapter" or "IP over Coax receiver" or "Power sourcing equipment (PSE)" 102 connects the cables 106, 107, 108 to a LAN infrastructure 103. The PSE 102 provides power to the cables 106, 107, 108. The PSE encapsulates uplink IP LAN traffic received from its LAN interface (not illustrated) into packets suitable for digital data transported on coaxial cables such as the HomePlug AV protocol, and sends them on the coaxial cables. The PSE 102 also extracts IP LAN traffic from packets received on downlink coaxial interfaces (not illustrated) and forwards them to the LAN interface.

The coaxial cables 106, 107, 108 can be used either to connect one or several cameras. For example, a first camera 131 is directly connected to a first coaxial cable 108, and a second camera 111 is connected to a second coaxial cable 106 by a T-style connector 109. T-style connectors can be used for increasing the number of cameras connected to a same coaxial cable. In the represented example, one camera 131 is connected to cable 108, two cameras 121, 122 are connected to cable 107, and four cameras 111-114 are connected to cable 106.

A coaxial camera, such as camera 131, may comprise an IP camera 141 (for example a model Dome PTZ VB-M50B of the company Canon) connected by an Ethernet cable to a terminal adapter 143. Typically, the terminal adapter 143 is a coaxial terminal adapter.

The LAN infrastructure 103 comprises the necessary switches, routers and gateways that are necessary to transport the IP video to a Video Monitoring System (VMS) 104 and to a digital video recorder 105.

The VMS 104 is configured to display the IP video streams for the purpose of surveillance. Also, the VMS 104 may display power diagnosis information from the different cameras when the information is included in the IP video stream sent by the camera, this information being considered as part of the OSD (from "On Screen Display") data.

A digital video recorder device 105 is configured to record the IP video stream, for example for later play-back.

An installation tool 140 is configured to configure the cameras 111-114. The installation tool 140 may be either a mobile or a hand-held device for configuring the cameras 111-114 "in-situ". In the described embodiment, the installation tool 140 is also configured to display power diagnosis information.

Two embodiments of a terminal adapter 143 are described with reference to FIGS. 2a and 2b.

Figure 2A:
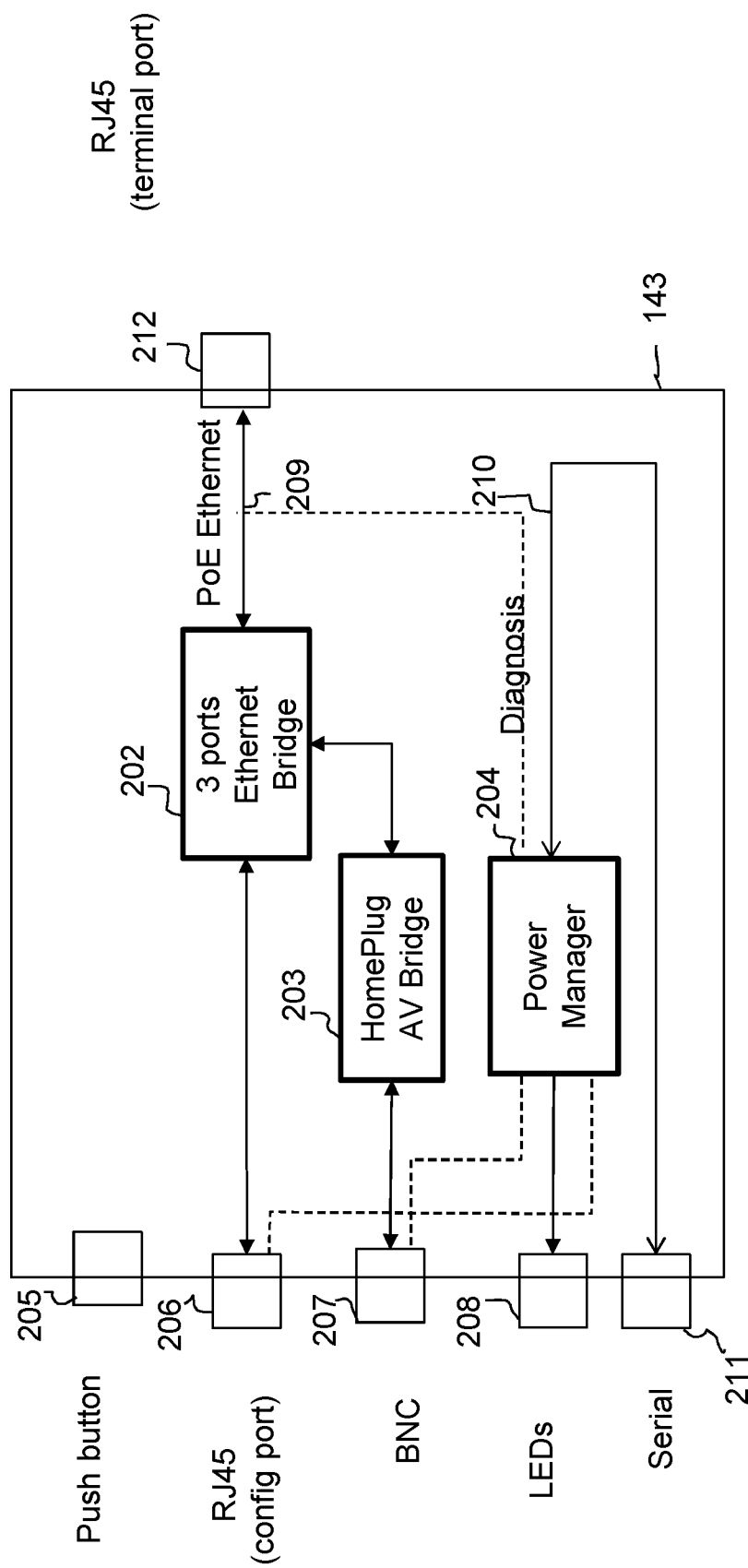
FIGS. 2a and 2b represent functional block diagrams of a terminal adapter according to first and second embodiments respectively.

A first embodiment of a terminal adapter is represented by FIG. 2a. According to this embodiment, the terminal adapter 143 is connected to the IP camera 141 through an Ethernet communication link 142 and is configured to implement functions of Ethernet transport over coaxial cable and power management. As will be described, the terminal adapter 143 is configured to implement power sensing, voltage drop estimation and correction of the estimated voltage drop.

In the represented embodiment, the terminal adapter 143 comprises a first RJ45 port 206, which is used for camera setup purposes and for detailed power diagnosis result display, a BNC port 207 which is used for IP communication over a coaxial cable, and a second RJ45 port 212 for connecting the IP camera 141.

The terminal adapter 143 further comprises a push button 205 for resetting the terminal adapter 143, a LED set 208 for displaying power diagnosis results, and a serial connector 211. The serial connector 211 may be used for sending power diagnosis information to an external device, such as the installation tool 140, connected to the terminal adapter 143 through the serial connector 211.

The terminal adapter 143 comprises a HomePlug AV bridge 203 which is configured to encapsulate the Camera IP traffic into HomePlug AV packets and to send them on the coaxial cable through the BNC port 207. The HomePlug AV Bridge 203 is also configured to extract IP traffic from the received HomePlug AV packets and to forward this extracted IP traffic to the IP camera 141.

As a variant, the serial connector 211 can be connected directly to the HomePlug AV bridge 203.

It may be noted that the first RJ45 port 206 is optional. Thus, according to another embodiment the terminal adapter 143 does not comprise this RJ45 port or config port 206.

The terminal adapter 143 further comprises an Ethernet bridge 202 which is configured to mix IP traffic from the first RJ45 port 206, the HomePlug AV bridge 203 and the second RJ45 port 212 (i.e. from the IP camera 141).

The terminal adapter 143 further comprises a power management module 204 or power manager module configured for managing the power distribution to the camera 141. The power management module 204 receives power from the BNC port 207 and/or from the first RJ45 port 206 and distributes the power to the camera 114, to the HomePlug AV Bridge 203 and to the Ethernet Bridge 202. The power management module 204 distributes the power according to PoE standards. The power management module 204 is detailed in FIG. 3a.

It may be noted that the power flow is represented by dashed lines in this Figure.

In the described embodiment, the power management module 204 may communicate data, through a serial line 210 and the serial connector 211, with an external device. The external device may be for example the installation tool 140, the power diagnosis information may be sent by the terminal adapter 143 to such an external device.

In the described embodiment, the terminal adapter 143 and the IP camera 141 are two different items of equipment.

According to another embodiment, the terminal adapter may be embedded in the camera.

Figure 2B:
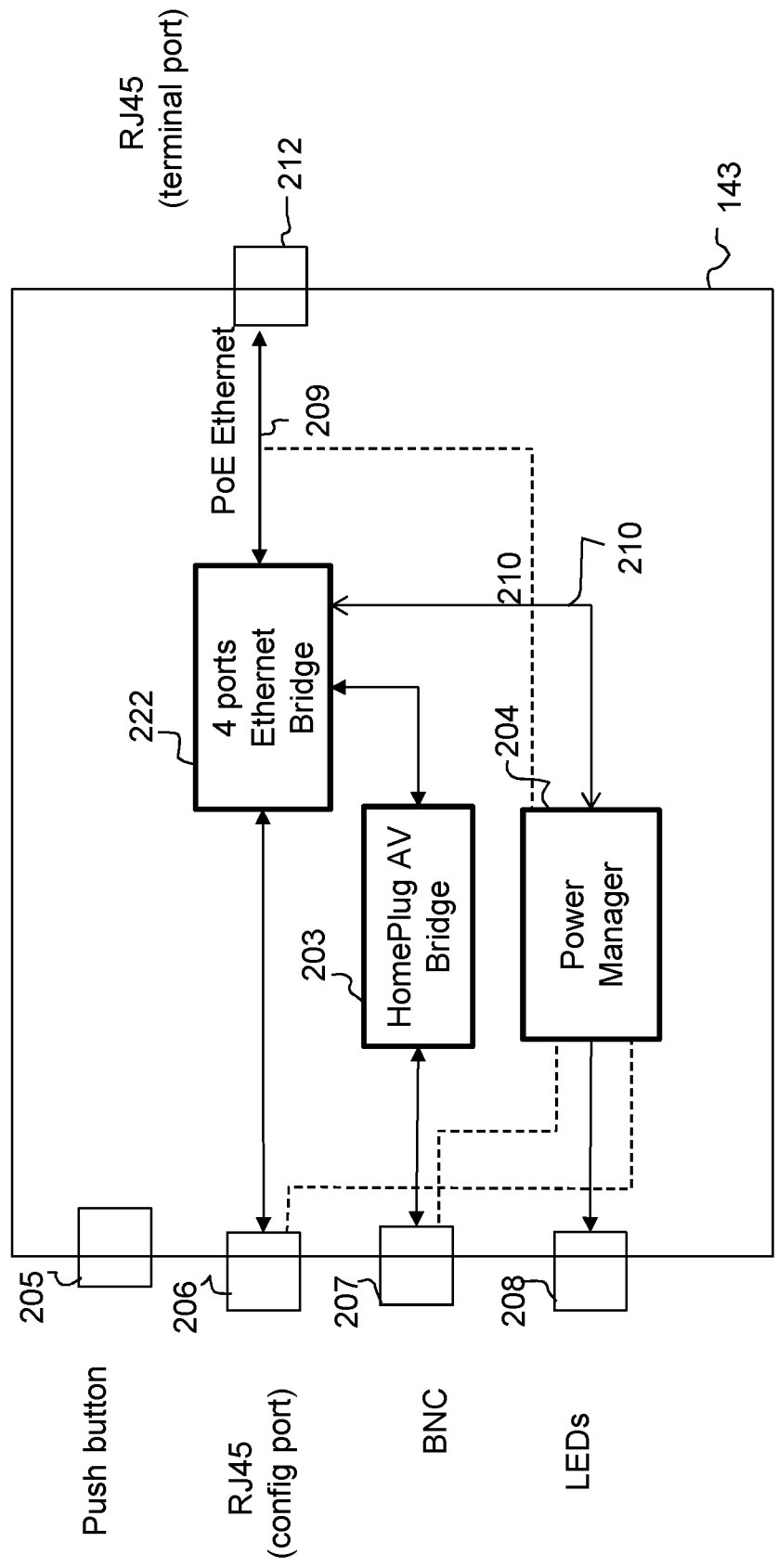

A terminal adapter 143 according to a second embodiment is represented by FIG. 2b. As for the first embodiment, the terminal adapter 143 is connected to the IP camera 141 through an Ethernet communication link 142 and is configured to implement functions of Ethernet transport over coaxial cable and power management. As will be described, the terminal adapter 143 is configured to implement power sensing, voltage drop estimation and correction of the estimated voltage drop.

The terminal adapter 143 according to the second embodiment is also configured to communicate with the PSE 102 and to negotiate the power the PSE 102 supplies to the camera. Thus, the terminal adapter 143 according to this embodiment comprises means for performing the second step of the PoE+ device classification.

The terminal adapter 143 according to the second embodiment is similar to the terminal adapter 143 according to the first embodiment (FIG. 2a) wherein the three-port Ethernet Bridge 202 is replaced by a four-port Ethernet bridge 222. Also, the power management module 204 in the terminal adapter 113 according to the second embodiment communicates by Ethernet with either the camera or with the PSE 102.

Except for the above differences, the description given with reference to FIG. 2a applies to the terminal adapter 143 represented by FIG. 2b.

Figure 3A:
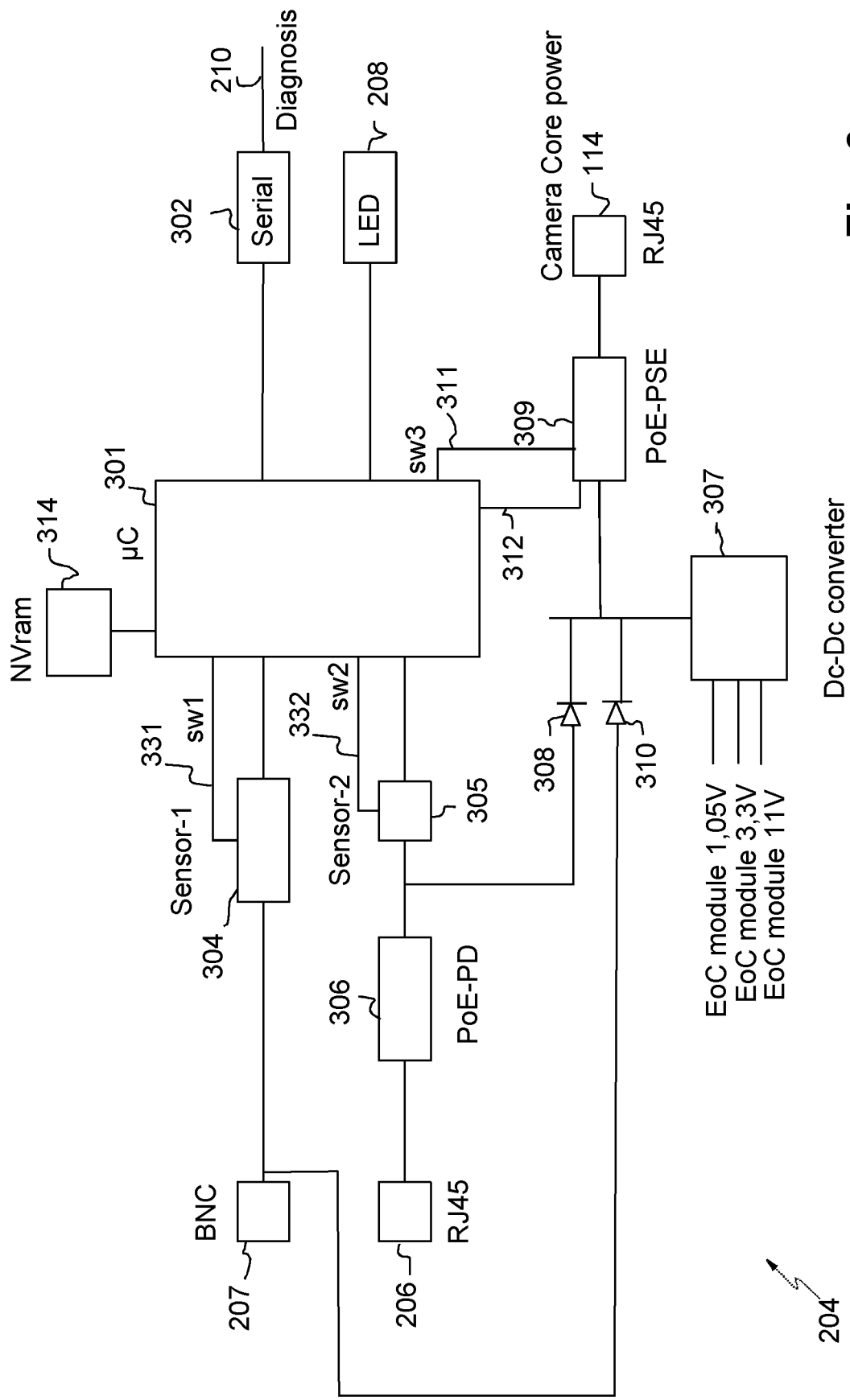

FIG. 3a illustrates in further detail the power management module 204 according to a first embodiment.

According to an embodiment, this power management module 204 may be used in a terminal adapter 143 according to the embodiment represented by FIG. 2a.

According to another embodiment, the power management module may be included in a PSE.

The power management module 204 comprises a first power sensor 304, a second power sensor 305, a first diode 310 and a second diode 308.

The first power sensor 304 is connected to a processor 301 by a connexion 331 through a first switch SW1. The processor 301 controls the first sensor 304 through the first switch SW1. The second power sensor 305 is connected to the processor by a connexion 332 through a second switch SW2. The processor 301 controls the second sensor 305 through the second switch SW2.

The processor 301 is configured to control and direct the execution of the instructions or portions of software code of the program or programs according to embodiments of the method for managing power that will be described with reference to FIGS. 8 and 9, which instructions are stored in storage means, such us a NVRAM circuit 314.

The power comes from the BNC port 207 and/or the RJ45 port 206 and is delivered to the camera by using a PoE PSE ("Power over Ethernet Power Sourcing Equipment") circuit 309 under the control of the processor 301.

The PoE PSE circuit 309 comprises a connexion interface suitable for connecting the power management module 204 to the camera 114.

The PoE PSE circuit 309 is connected to the processor by a connexion 311 through a third switch SW3. The processor 301 controls the PoE PSE circuit 309 through the third switch SW3.

In particular, the power coming from the BNC port 207 goes through the first power sensor 304 and the first diode 310. Signals originating from the first power sensor 304 (described with reference to FIG. 4) are used by the processor 301 to estimate the power that the power management module 204 is able to supply to the camera 141 and to determine the available power delivered on the coaxial cable 106, 107, 108 by the PSE 102.

In the described embodiment, the first and second diodes 308, 310 combine respectively the power coming from the RJ45 port 206 and the BNC port 207 and the combination is fed to both a DC-DC converter 307 and the PoE PSE circuit 309.

The DC-DC converter 307 converts the PoE and/or PoC ("Power over Coax") input power voltage into the power needed by the terminal adapter 113. The voltages on PoE and PoC may be for example 56 V. The voltages needed by the terminal adapter 143 can be for example 11 volts, 1.3 volts and 1.05 volts.

In the described embodiment, the power coming from the RJ45 port 206 goes through a PoE PD ("Powered Device") front-end circuit 306. Next, the power goes through the second power sensor 305 and the second diode 308. The power sensor 305 is used by the processor 301 to estimate the power that the power management module 204 is able to supply to the camera 114 and to determine the available power delivered on the Ethernet cable connecting the terminal adapter 143 and the camera 141.

Thus, the power management module 204 comprises means for estimating a power that the power management module 204 is able to supply via the connexion interface.

The camera 141 is powered by means of the power sent through the second RJ45 port 212. The second RJ45 port 212 receives power from the PoE PSE ("Power Source Equipment") circuit 309. The PoE PSE circuit 309 receives power as a combination of the power delivered by the BNC port 207 (from the coaxial cable) through the first diode 310 and the power delivered by the first RJ45 port 206 through the second diode 308.

In the described embodiment, the processor 301 communicates power diagnosis information to the IP camera 141 by serial communication. In particular, the processor 301 is connected to a serial port 302 which is connected to the communication line 210.

The processor 301 drives the LED set 208 for power diagnosis feedback to the installer.

A NVRAM circuit 314 is used by the processor 301 to store and retrieve configuration parameters and parameters used when implementing the method of managing power according to the invention.

Figure 3B:
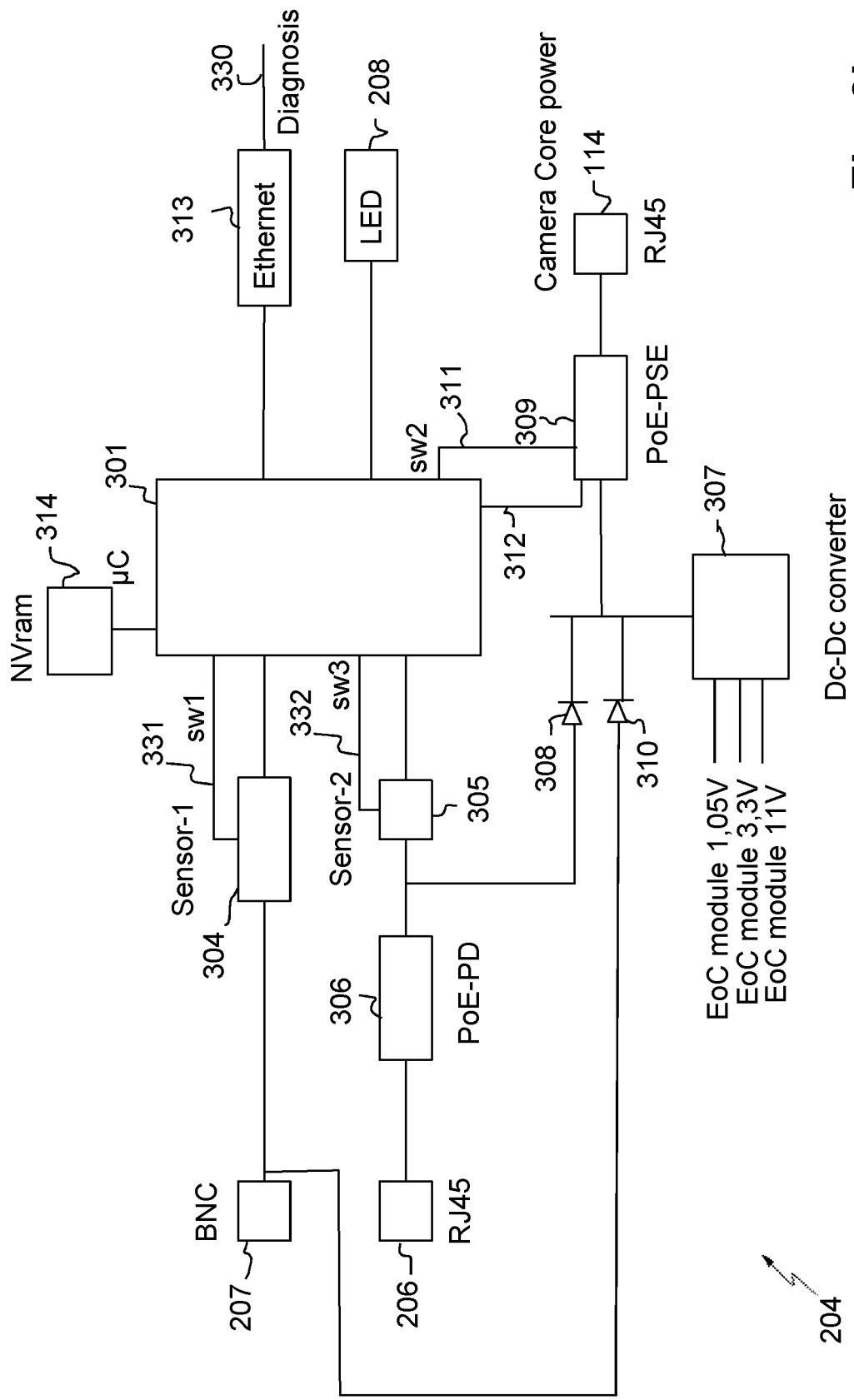
FIG. 3b represents a functional block diagram of a power management module of a terminal adapter according to the second embodiment represented by FIG. 2b.

FIG. 3b illustrates in further detail the power management module 204 according to a second embodiment. According to an embodiment, this power management module 204 may be used in a terminal adapter according to the embodiment represented by FIG. 2b.

According to another embodiment, the power management module may be included in a PSE.

The power management module represented by FIG. 3b corresponds to the power management module represented by FIG. 3a wherein the serial port 302 has been replaced by an Ethernet port 313.

A method for resetting at least a processing device in a power-over-data linear bus interconnecting a plurality of processing devices according to an embodiment will be described with reference to FIGS. 8 and 9.

Figure 4:
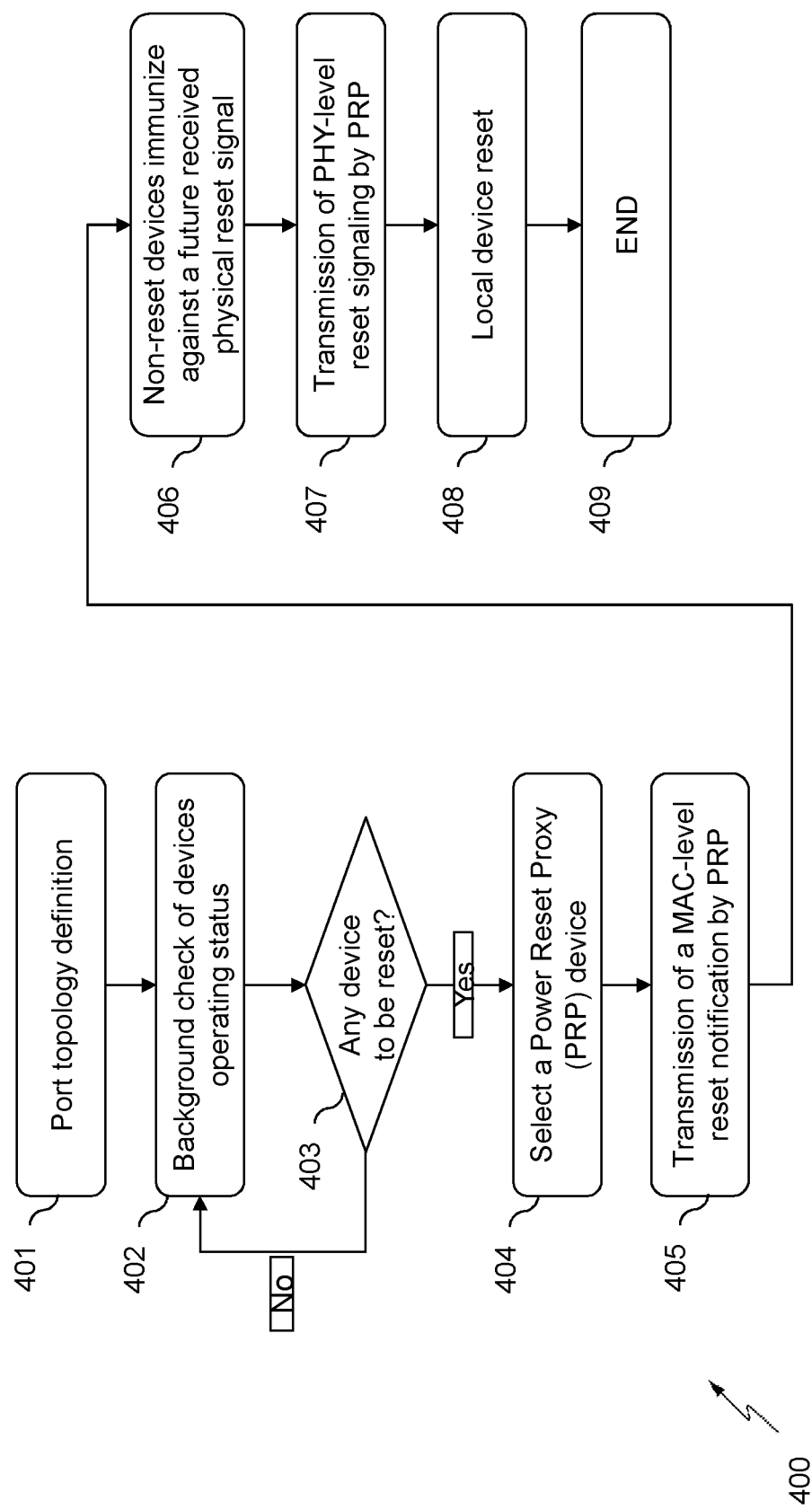
FIG. 4 is a flowchart describing an algorithm for managing a selective device reboot or reset in a linear bus topology, according to an embodiment of the present invention.

FIG. 4 illustrates a flow chart representing a method for resetting at least a processing device in a power-over-data linear bus interconnecting a plurality of processing devices according to an embodiment.

The steps illustrated by FIG. 4 are implemented by the processor 301 (FIGS. 3a and 3b) of the power management module 204, the power management module 204 comprising means for implementing the method according to the invention.

It may be noted that thanks to the method for resetting at least a processing device in a power-over-data linear bus interconnecting a plurality of processing devices, the at least a processing device is selectively reset even if a reset notification is sent to all processing devices interconnected by the power-over-data linear bus.

In other words, the method for resetting at least a processing device is a method for performing a selective reset of the at least a processing device.

Figure 5:
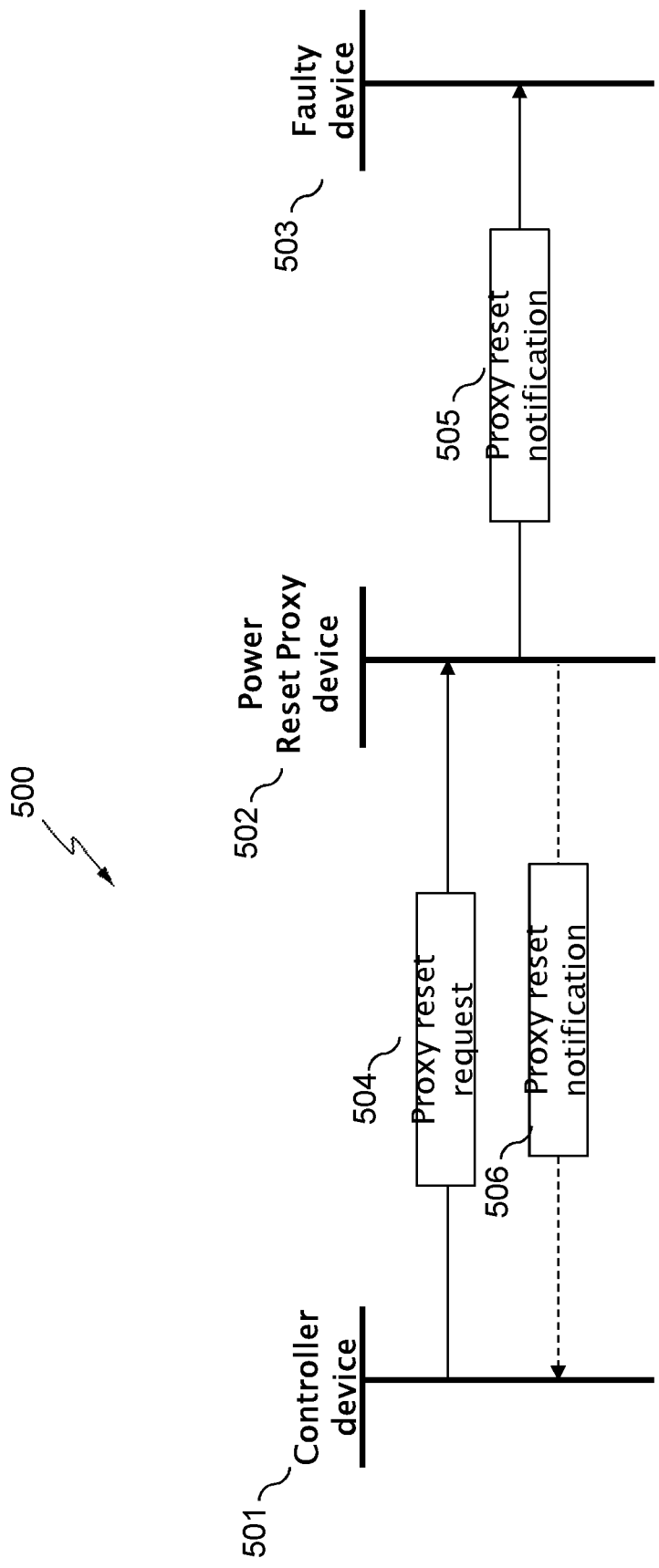
FIG. 5 illustrates some operations to be processed by some devices in order to perform a selective device reboot or reset in a linear bus topology, according to an embodiment of the present invention.

FIG. 5 illustrates a sequence of operations performed by three devices 501, 502, 503 in order to perform a selective device reboot or reset in a power-over-data linear bus topology, according to an embodiment of the present invention.

In the embodiment represented by FIG. 5, a first device 501 is a controller device, a second device 502 is a Power Reset Proxy device or PRP device, and third device 503 is a faulty device.

According to an embodiment, the method for resetting a processing device comprises a first step 401 wherein the port topology of the digital video surveillance system is determined. In this first step 401, it is verified to which port of the central point or PSE 102 are connected the plurality of processing devices 111, 112, 113, 114, 121, 122, 131.

Thus, according to the described embodiment, at the first step 801 it is determined that four processing devices 111, 112, 113 and 114 are connected to the a first port of the PSE 102, two processing devices 121 and 122 are connected to a second port of the PSE 102, and a processing device 131 is connected to a third port of the PSE 102.

Different solutions may be used for determining the port topology performed in the first step 401.

According to one solution, a processing device generates a voltage variation having a predetermined pattern, such as a voltage drop pulse, in the coaxial cable to which the processing device is connected. Since voltage variations are filtered between ports in the PSE, the port to which the processing device is connected is the port from which the voltage variation is detected. The voltage variation may be announced by the processing device, or another device, prior the generation in an announcement packet containing an identifier of the processing device; thus the identity of the processing device connected to the port is known. The generation of voltage variations are repeated for other processing devices for determining the complete port topology.

According to another solution, the port topology is entered by a user of the system, for example through the user interface of a Video Monitoring System (VMS) 104 (FIG. 1). Thus, for example, the port topology is communicated to the processing devices of the system 111, 112, 113, 114, 121, 122, 131 through the LAN 103 and the central point or PSE 102.

According to an embodiment, the method for resetting a processing device comprises a step for checking 402 the status of each of the processing devices 111, 112, 113, 114, 121, 122, 131 of the plurality of processing devices.

The status of a processing device 111, 112, 113, 114, 121, 122, 131 may be either a normally functioning status or a faulty status.

According to a first embodiment, a central device of the system manages the whole process of selective device reboot or reset. Such central device may be, for instance, the VMS device 104, the PSE head end device 102 or any of the processing devices 111, 112, 113, 114, 121, 122, 131. The processing devices may include either an IP camera device, such as IP camera 141 in FIG. 1, or a coax terminal adapter, such as the adapter device 143 in FIG. 1.

According to another embodiment, the whole process of selective device reboot is managed by all or some of the devices in the system. Thus, the process may be managed by all or some of the devices among the VMS device 104, the PSE head end device 102 and any of the processing devices 111, 112, 113, 114, 121, 122, 131. The processing devices may include either an IP camera device, such as IP camera 141 in FIG. 1, or a coax terminal adapter, such as the adapter device 143 in FIG. 1.

According to an embodiment, checking the operating status of a processing device may be implemented by detecting the periodic transmission by each of the processing devices 111, 112, 113, 114, 121, 122, 131 of a "still alive" message or physical signalling. If one or more consecutive "still alive" messages are not received from a processing device, this processing device is considered as a faulty processing device or having a faulty status. The processing device is no longer operational.

According to another embodiment, checking the operating status of a processing device may be implemented by detecting the reception of a video stream from each of the processing devices 111, 112, 113, 114, 121, 122, 131 by the VMS 104. A processing device is considered as being a faulty processing device (i.e. a processing device being no longer operational or having a faulty status) when no video stream is received from the processing device for a predefined time period.

According to another embodiment, checking the operating status of a processing device may be implemented by transmitting a specific request message to each processing device and detecting the response sent by each processing device. A processing device is considered as having a faulty processing device (i.e. a processing device being no longer operational or having a faulty status) when no response is received from the processing device.

The person skilled in the art may easily find other methods to verify the operating status of the processing devices.

Once the status of the processing devices has been checked at the checking step 402, a verifying step 403 is implemented in order to identify whether at least a processing device has a faulty status.

When at the verifying step 803, a processing device 111, 112, 113, 114, 121, 122, 131 is verified as having a faulty status (i.e. that needs to be reset), a first processing device is selected at a selecting step 404.

The first processing device is named Power Reset Proxy (PRP) device, and it is defined as the processing device in charge of performing the selective reboot or reset of the processing device which has been identified as having a faulty status.

According to an embodiment, the selecting step 404 may be performed by a central device in the system. Such central device may be, for instance, the VMS device 104, the PSE head end device 102 or any of the processing devices 111, 112, 113, 114, 121, 122, 131. The processing devices may include either an IP camera device, such as IP camera 141 in FIG. 1, or a Coax terminal adapter, such as the adapter device 143 in FIG. 1.

According to another embodiment selecting step 404 may be performed by all or some of the devices in the system.

According to the described embodiment, the first processing device or PRP device is selected from among the processing devices which are directly connected (or having a direct physical connection) to the processing device verified as having a faulty status.

According to an example, if the processing device referenced 113 (FIG. 1) has a faulty status, the processing devices 111, 112, 114 connected to the same port of the PSE 102 through the first cable 106 may be selected as a PRP device.

According to an embodiment, the first processing device is selected as being the closest processing device connected to the processing device verified as having a faulty status.

For instance, in the previous example wherein processing device 113 has a faulty status, the processing device referenced by 112 or the processing device referenced by 114 would be selected as being a PRP device.

According to another example, if the processing device referenced by 131 has a faulty status, only the PSE 102 can be selected as the first processing device or PRP device.

Once the PRP device has been selected, at a sending step 405, the PRP device sends a protocol data unit comprising a prior-reset notification to all other processing devices of the plurality of processing devices.

According to an embodiment, the protocol data unit is a Medium Access Control (MAC) protocol data unit. Thus, the protocol data unit comprises a MAC level prior-reset notification.

According to an embodiment, the first processing device or PRP device 502 (FIG. 5) sends the protocol data unit on receiving, from a central controlling device 501, a request for sending the protocol data unit.

According to this embodiment, the central controller device 501 requests the PRP device 502 to send a MAC-level reset notification. The central controller device 501 thus sends a "Proxy reset request" 504 to the PRP device 502. For instance, the VMS 104 may act as the central controller device 501 and the processing device referenced by 112 as the PRP device 502. In this example, the VMS 104 (501) requests the processing device 112 (502) to send the MAC-level reset notification to all the processing devices.

According to another embodiment, the PRP device 502 determines on its own that it should transmit a MAC-level reset notification. For instance, the processing device 112, which acts as the PRP device 502, may decide on its own to send a MAC-level reset notification at the sending step 405.

The format of the messages 504, 505 and 506 will be described with reference to FIG. 10.

Next, each processing device receives at a reception step 406 a protocol data unit comprising a MAC level reset notification 505, 506.

When, at the reception step 406, the processing device is able to process the received protocol data unit, the processing device is immunized against a physical reset signal received later (to be sent in step 407).

According to an embodiment, the immunization comprises deactivating a local reset circuit on receiving a physical reset signal. This embodiment will be described with reference to FIGS. 8 and 9.

According to another embodiment, the immunization comprises activating a capacitive circuit on receiving a physical reset signal. This embodiment will be described with reference to FIGS. 6a and 6b.

In any case, a faulty processing device or a processing device having a faulty status (i.e. a processing device that is not able to process the received MAC-level reset notification message 505, 506 sent by the PRP device 502) will not be immunized against a physical reset signal received later.

When the PRP device 502 generates and sends to all other processing devices, a physical reset signal at a second sending step 507, the physical reset signal is selectively performed at a reset step 508. This reset step 508 will be described with reference to FIGS. 6a, 6b, 8 and 9.

In particular, in the reset step 408, the processing devices which has not been immunized against the reception of a physical reset signal, are reset.

It may be noted that the PRP device 502 generates the physical reset signal over the cables 106, 107, 108.

Finally, the method goes to an end state 409.

Note that steps 401, 402, 403 and 404 are optional steps. Indeed, in an alternate embodiment, the flow chart of FIG. 4 starts at step 405. In this embodiment, the processing device having a faulty status may be known by any other means, such as user input, and the PRP device may be a predetermined device.

Figure 6:
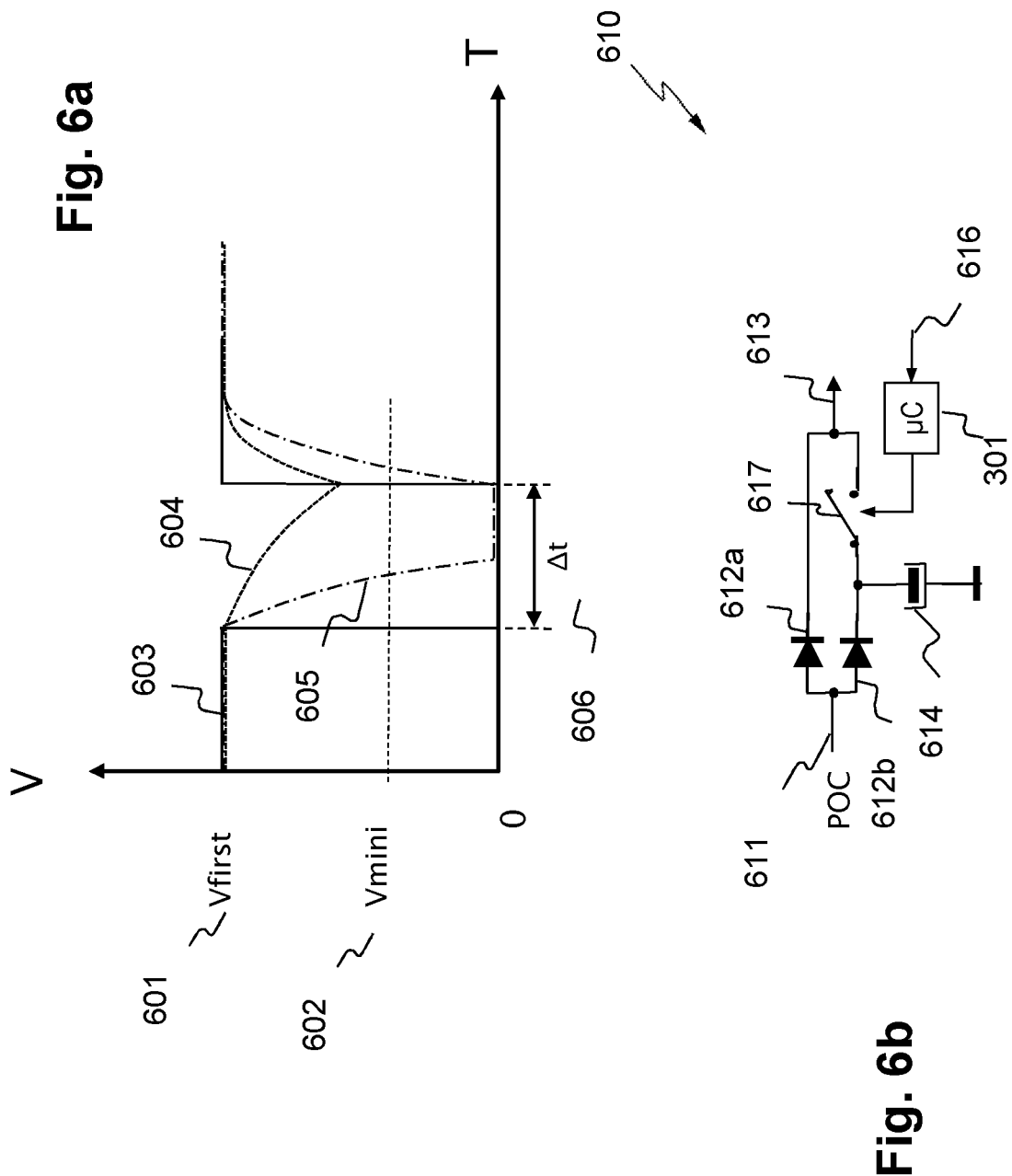
FIGS. 6a and 6b illustrate a physical signalling scheme and an associated analogue circuit according to a first embodiment of the present invention.

FIGS. 6a and 6b illustrates a physical signalling scheme and an associated analogue circuit according to a first embodiment of the present invention.

FIG. 6a represents a physical signalling scheme illustrating the functioning of the electrical circuit 610 represented by FIG. 6b.

The physical signalling scheme of FIG. 6a represents voltage versus time within the processing device.

When the processing device is normally powered, the voltage 603 is stable at a predefined voltage value Vfirst 601. This predefined voltage value Vfirst 601 is sufficient to power the device. When a reset or brief power cut is generated, for example by the PSE 102, during a period of time Δt 606, and received by a processing device that is not immunized, the voltage at the processing device becomes lower than a critical minimum operating voltage Vmini 602 and the device is powered-off.

If the processing device comprises an electrical circuit 610 such as that represented by FIG. 6b, the processing device is not reset.

The electrical circuit 610 represented by FIG. 6b allows selection of a device not to be re-initialized, in order to have service continuity, i.e. without video cut.

FIG. 6b illustrates a first embodiment of a circuit for immunizing 610 the processing devices against physical reset signal.

The circuit for immunizing 610 according to this embodiment is a capacitive circuit that is activated on receiving a physical reset signal if the processing device is immunized against a physical reset signals.

The electrical circuit 610 represented by FIG. 6b comprises a first diode 612a and a second diode 612b connected between a power input 611 of the processing device and a regulator input 613 through which the power is supplied to the internal voltage regulator of the processing device.

The processing device is powered by the PoC (Power over Coax) through the power input 611, for example with 56 volt.

When the processing device has a normally functioning status, the current originating from the power supply passes through the first diode 612a to supply the internal voltage regulator of the processing device through the regulator input 613.

The electrical circuit 610 further comprises a switch 617 situated between the second diode 612b and the regulator input 613. The switch 617 may be in a closed position or in an open position according to a command originating from the microcontroller 301.

When the processing device is normally powered, the switch 617 is in the open position.

The electrical circuit 610 further comprises a capacitor 614 for storing energy coming from the PoC 611 through the diode 612b.

When a processing device receives a message 616 informing of a brief power cut or prior-reset notification, the microcontroller 301 activates the switch 617 to put it in closed position in order to deliver the stored energy in the capacitor 414 to the voltage regulator input through 613 as an energy back-up. Thus, the power supply internal to the processing device is maintained at a level higher than the critical minimum operating voltage Vmini 602 and the reset is not implemented. Thus, the processing device continues functioning, for example continues streaming a video.

Figure 7:
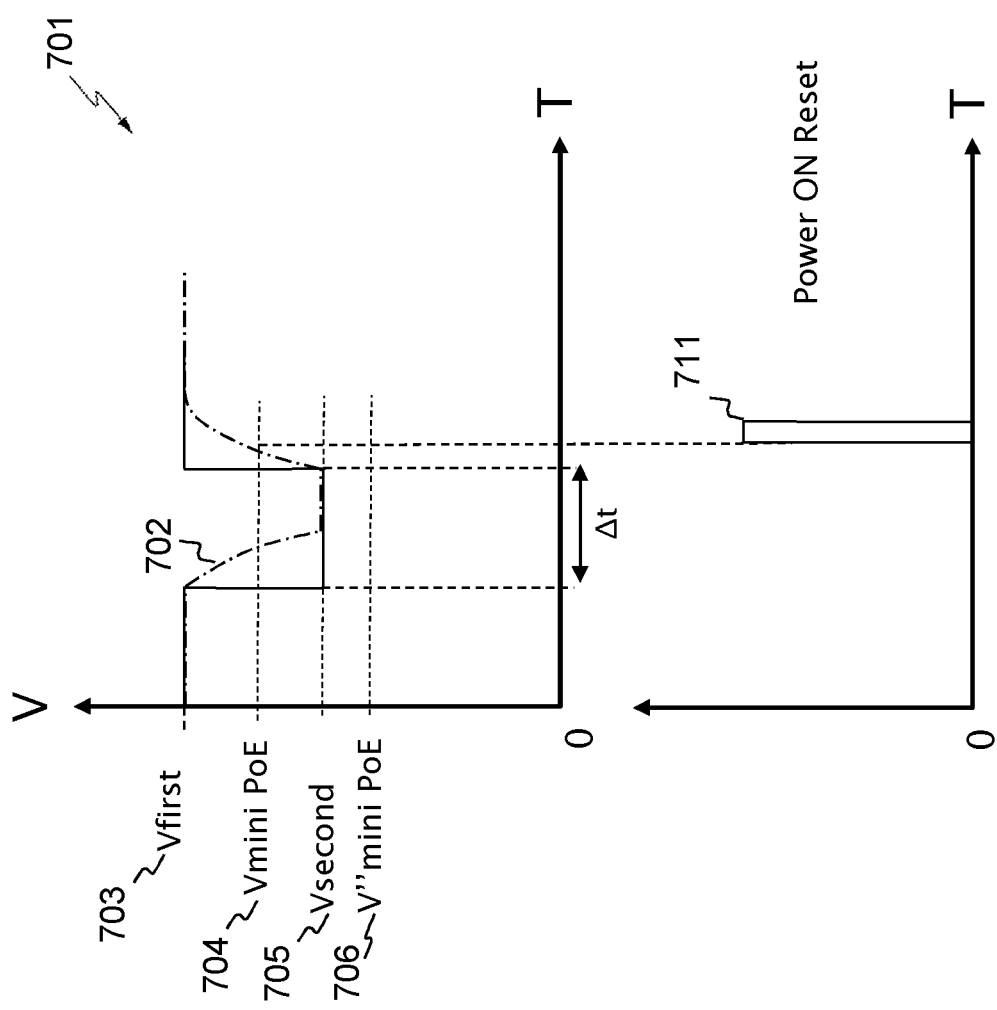
FIG. 7 illustrates a physical signalling scheme according to a second embodiment of an analogue circuit of the present invention.

FIG. 7 represents a physical signalling scheme 501 according to a second embodiment of the present invention.

The physical signalling scheme of FIG. 7 represents voltage V versus time T within the processing device.

As in the previously described embodiment, a reset or brief calibrated power cut is generated by the PSE 102 or any other processing device on a segment.

In this embodiment, the PoE thresholds are defined by IEEE802.3af or IEEE802.3at standards.

In this embodiment, when a reset or brief calibrated power cut is generated, the voltage 702 decreases just below the PoE threshold, without falling down to zero volts.

For example, in the IEEE802.3-2012 PoE standard, the powered device power supply turn off voltage is 30 volts, represented by 504 (Vmini PoE) in FIG. 7.

In this embodiment, for processing devices which has previously received a prior-reset notification, the voltage 504 (Vmini PoE) is decreased down to voltage 506 (V"mini PoE).

Therefore, the voltage for the processing devices not having received a prior-reset notification is represented by reference 502, the voltage 502 falling down to a voltage 505 (Vsecond) below the PoE threshold. When the processing device is powered up, a Power ON Reset signal 511 is generated when the voltage becomes higher than the PoE threshold, and the processing device is turned on.

Figure 8:
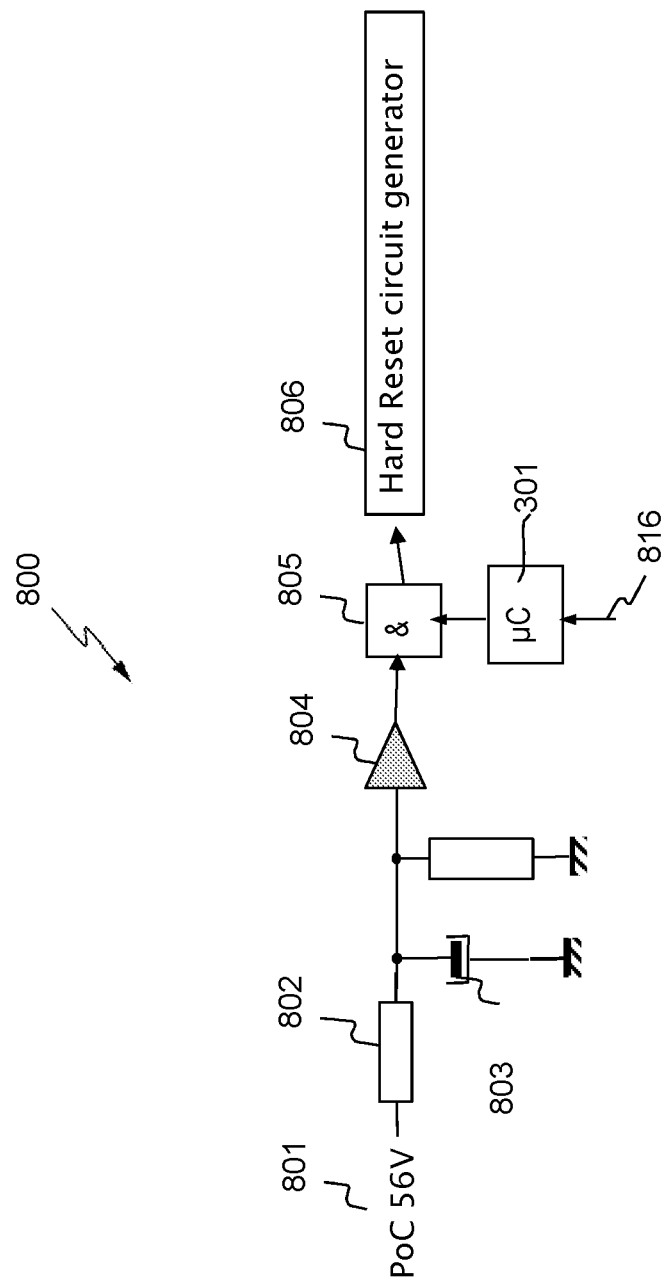
FIG. 8 illustrates an analogue circuit according to a third embodiment of the present invention.

FIG. 8 illustrates a second embodiment of a circuit for immunizing the processing devices against physical reset signal.

The circuit for immunizing according to this embodiment comprises a pulse detector circuit 800. This circuit 800 detects a calibrated pulse, or brief calibrated power cut, on the line or cable 106, 107, 108 and generates a reset of the processing device or camera.

In this embodiment, when a very short calibrated voltage drop is generated by the PSE 102 in the line, a reset is not generated in the processing device. A very brief voltage drop means that the power supply cut is not sufficiently to turn-off turn-on the devices. For example, a power cut for a period of 50 ms can be done without consequences on the quality of service, i.e. video streaming continues without video surveillance disruption.

The input 601 of this circuit 800 is connected to the Power over Coax line or cable 106, 107, 108.

The circuit 600 comprises a resistance 802 and a capacitor 803, both forming an integrator for filtering high frequencies. The circuit 800 further comprises a comparator 804 detecting a voltage difference between a reference voltage and the voltage at its input. If the voltage at its input is lower than the reference voltage, the comparator 804 generates at its output a logic state (which for example is "1").

The circuit 800 further comprises an AND gate 805 connected to the output of the comparator 804 and receiving as a first input the logic state generated at the output of the comparator 804.

According to an example, the comparator circuit 804 is a LM311 model of the company Texas Instruments.

The AND gate 805 receives as a second input a signal originating from the processor 301. This signal originating from the processor 301 indicates whether or not a prior-reset notification 816 has been received by the processing device. The output of the AND gate 805 is connected to a circuit 606 generating a reset, named reset circuit generator 806.

According to an example, the reset circuit generator 806 generates a reset when it input is at a "high" or "1" logic state.

According to the described example, when the processing device has a faulty status, the processor 301 maintains the second input of the AND gate 605 in its default state, which is a "high" or "1" logic state in the described embodiment. Thus, when a reset is received (the output of the comparator 604 being a "high" or "1" logic state), the reset circuit generator 606 of the processing device generates a reset.

When the processing device does not have a faulty status, i.e. is working correctly, and receives a prior-reset notification 816, the second input of the AND gate 605 is a "low"

or "0" logic state such that even though a physical reset signal is received by the processing device (and the comparator 804 generates a "high" or "1" logic state") the reset circuit generator 806 of the processing device does not generate a reset of the processing device.

Figure 9:
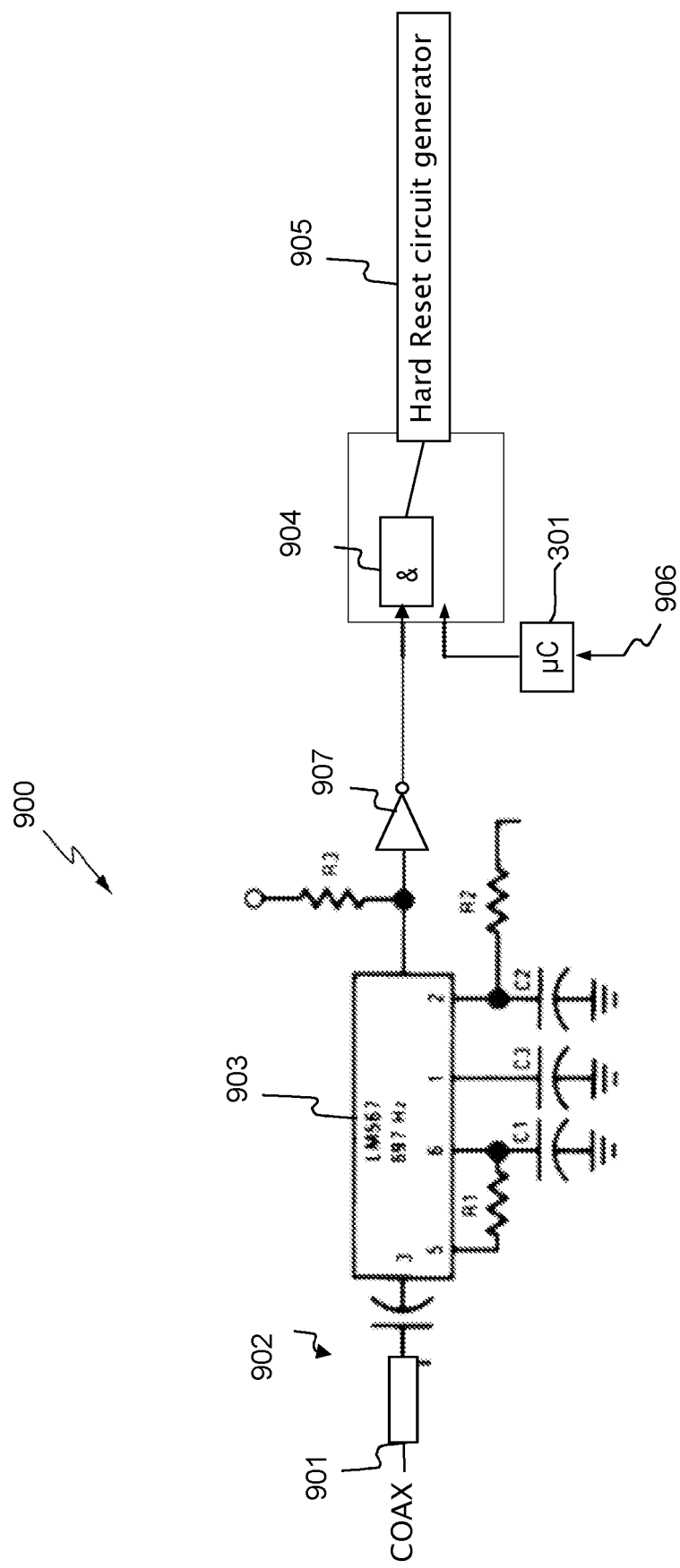
FIG. 9 illustrates an analogue circuit according to a fourth embodiment of the present invention.

FIG. 9 illustrates a third embodiment of a circuit for immunizing the processing devices against physical reset signal.

The circuit for immunizing according to this embodiment comprises a circuit 900 detecting tone pulses. The circuit 900 is connected between the line 106, 107, 108 and a reset circuit generator 905 of the processing device.

For example, a tone pulse is a square signal with a frequency of 697 Hz. Of course, the value of the frequency and the type of signal may be different.

According to this embodiment, when one or several processing devices have to be reset, a tone pulse is generated by the PSE 102 or by any one of the processing devices.

The circuit 900 comprises a filter circuit 902 connected to its input 901, and a detector circuit 903 connected to the output of the filter circuit 902.

For example, the detector circuit 903 is a model LM567 of the company Texas instruments.

When the detector circuit 903 detects the tone pulse at its input 901, it generates at its output a logical level "high" or "1". The output of the detector circuit 903 is connected to a first input of an AND gate 904 though an inverter 907.

The AND gate 704 receives as a second input a signal originating from the processor 301 indicating whether or not a prior-reset notification 906 has been received by the processing device. The output of the AND gate 904 is connected to the circuit 905 generating a reset which is named reset circuit generator 905.

According to the described embodiment, the reset circuit generator 905 generates a reset when its input is at a "high" or "1" logic state.

When the processing device has a faulty status, the processor 301 maintains the second input of the AND gate 904 at its default state, which is a "high" or "1" logic state in the described embodiment. Thus, when a reset is received, and the detector circuit 903 has detected a tone pulse, the reset circuit generator 905 of the processing device generates a reset.

When the processing device does not have a faulty status, i.e. is working correctly, and receives a prior-reset notification 906, the second input of the AND gate 904 is a "low" or "0" logic state such that even though a physical reset signal is received and the detector circuit 903 detects a toner pulse, the reset circuit generator 905 of the processing device does not generate a reset of the processing device. Thus, when the processing device receives a prior-reset notification 906, the second input of the AND gate 904 is set to a "low" or "0" logic state and the output of the AND gate 904 is thus set to a "low" or "0" logic state. Therefore, the circuit 900 prevents the processing device from resetting (i.e. avoids the processing device performing a reset).

Figure 10:
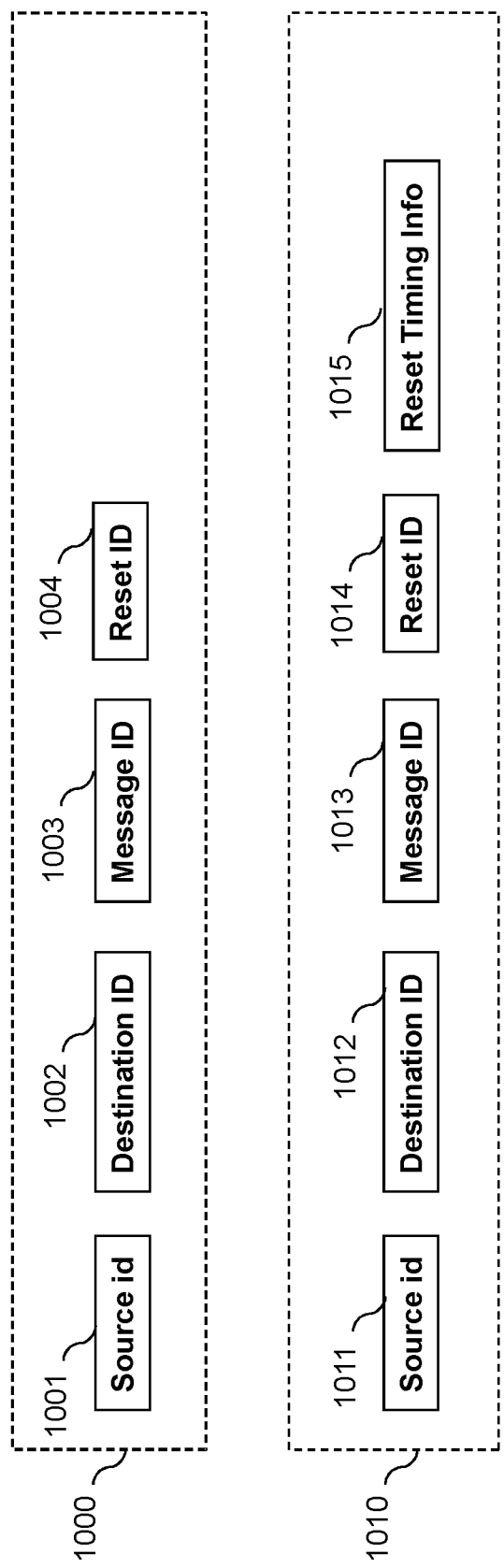
FIG. 10 illustrates the format of messages exchanged by the devices represented by FIG. 5, according to an embodiment of the present invention.

FIG. 10 illustrates the format of the messages exchanged by the devices 501, 502, 503 represented by FIG. 5, according to an embodiment.

A first message 1000 corresponds to the Proxy reset request 504 sent by the controller device 501 to the PRP device 502. The first message 1000 contains the following information:

A source ID 1001 identifying the processing device sending the message. The source ID may be for example a MAC address of the central controller device;

A destination ID 1002 identifying the PRP processing device to which this message is sent. The destination ID may be for example a MAC address of the PRP device;

A message ID 1003 identifying the message 1000; and

A reset ID 1004 identifying a processing device having a faulty status. The reset ID 1004 may be for example a MAC address of the faulty processing device, or MAC addresses of the non-faulty devices.

According to an embodiment, when a plurality of processing devices has a faulty status, a first message 1000 is generated for each processing device. According to another embodiment, a first message 100 is generated for the plurality of faulty processing devices, the reset IDs 1004 of the processing devices are concatenated.

A second message 1010 corresponds to a Proxy reset notification 505, 506 sent by the PRP device 502 to the faulty device 503 and the controller device 501.

The second message 1010 contains the following information:

A source ID 1011 identifying the processing device sending the message. The source ID may be for example a MAC address of the PRP device;

A destination ID 1012 identifying the processing device, or the plurality of processing devices, to which this message is sent. The destination ID may be for example a MAC address;

A message ID 1013 identifying the message 1010;

A reset ID 1014 identifying a processing device having a faulty status. The reset ID 1004 may be for example a MAC address of the faulty device, or MAC addresses of the non-faulty devices; and A reset Timing Info 1015 indicating the remaining time before the physical reset signal is generated by the PRP device.

Figure 11:
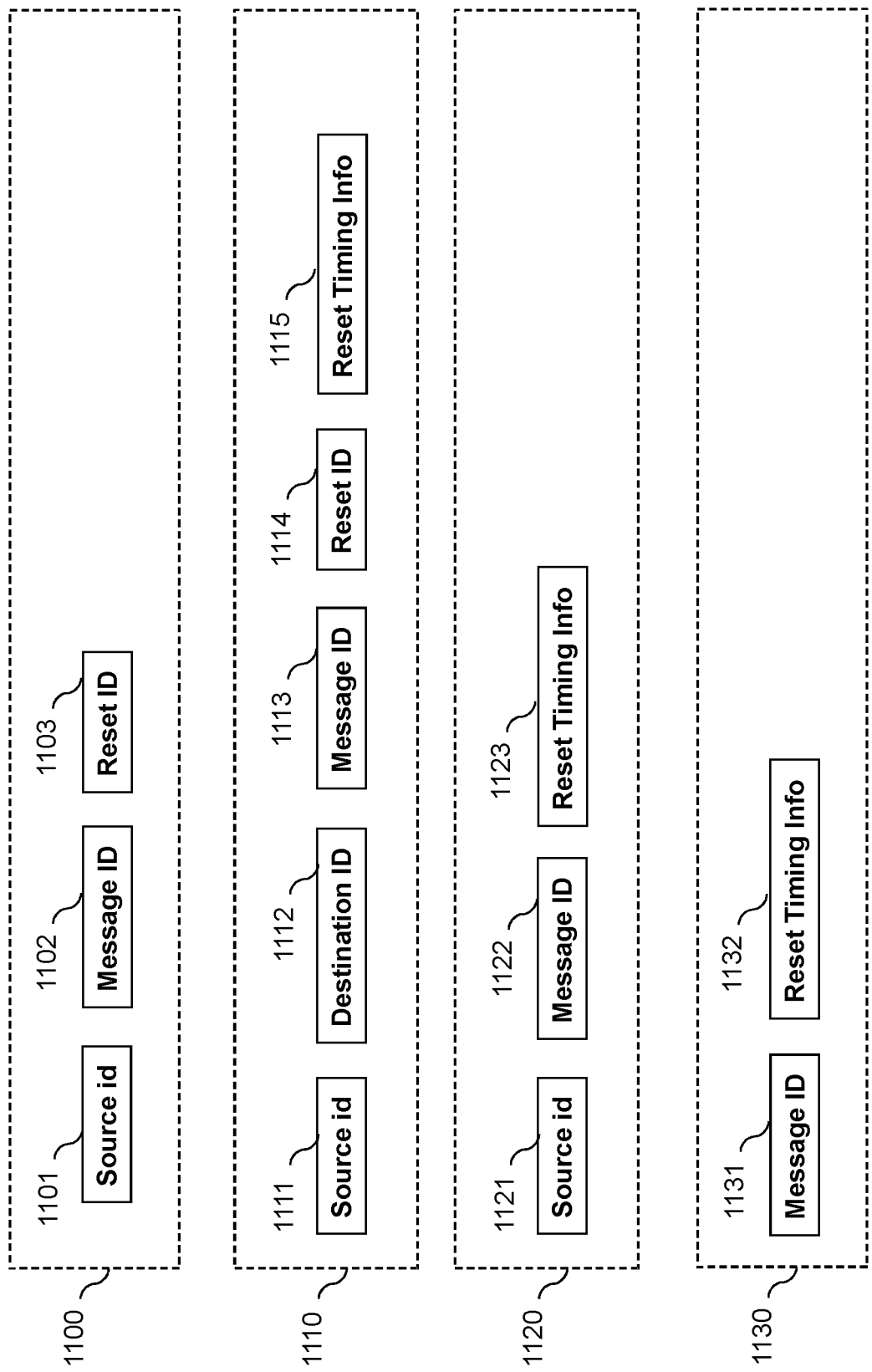
FIG. 11 illustrates the format of messages exchanged between a terminal adaptor and a camera according to an embodiment.

FIG. 11 illustrates the format of the messages exchanged between a terminal adaptor and a camera according to an embodiment, for example between a Coax terminal adapter 143 and an IP camera 141.

According to an embodiment, if the IP camera is acting as a PRP device 502, it receives a message 1100 from the coax adapter terminal 143. Message 1100 corresponds to a Proxy reset request 504 sent by the controller device 501 to the PRP device 502. This message 1100 contains the following information:

A source ID 1101 identifying the processing device sending the message. The source ID may be for example a MAC address of the central controller device. This information may not necessarily be sent to the IP camera 141;

A message ID 1102 identifying the message 1100. On receiving this message, the IP camera 141 understands that it has been selected as the PRP device 502; and A reset ID 1103 identifying a processing device having a faulty status. The reset ID 1004 may be for example a MAC address of the faulty processing device, or MAC addresses of the non-faulty device.

According to an embodiment, when a plurality of processing devices has a faulty status, a first message 1000 is generated for each processing device. According to another embodiment, a first message 100 is generated for the plurality of faulty processing devices, the reset IDs 1004 of the processing devices are concatenated.

According to this embodiment, wherein the IP camera is acting as a PRP device 502, it sends the message 1110 to the adapter terminal 143. Message 1110 corresponds to a Proxy reset request 504 sent by the controller device 501 to the PRP device 502. This message 1110 contains the following information:
- A source ID 1111 identifying the processing device sending the message. The source ID may be for example a MAC address of the PRP device;
- A destination ID 1112 identifying the processing device, or the plurality of processing devices, to which this message is sent. The destination ID may be for example a MAC address;
- A message ID 1113 identifying the message 1110;
- A reset ID 1114 identifying a processing device having a faulty status. The reset ID 1004 may be for example a MAC address of the faulty device, or MAC addresses of the non-faulty devices; and
- A reset Timing Info 1115 indicating the remaining time before the physical reset signal is generated by the PRP device.

According to an embodiment, if the IP camera 141 is not acting as a PRP device 502, it may receive either a message 1010, as described with reference to FIG. 10, or a message 1120, from the adapter terminal 143.

Message 1120 informs the IP camera 141 that a MAC-level Proxy Reset notification 504, 505 has been received.

The IP camera 141 on receiving a receiving message 1010, 1120 is aware that the Coax terminal adapter 143 is immunized against a power reset.

Message 1120 contains the following information:
- A source ID 1121 identifying the processing device sending the message. The source ID may be for example a MAC address of the central controller device. This information may not necessarily be sent to the IP camera 141;
- A message ID 1122 identifying the message 1120. On receiving this message, the IP camera 141 is aware that a MAC-level Proxy Reset notification has been received by the Coax terminal adapter 143; and
- A reset Timing Info 1123 indicating the remaining time before the physical reset signal is generated by the PRP device 502.

According to an embodiment, the IP camera 141 may request that the Coax terminal adapter 143 is immunized against a later physical reset signal (as described with reference to FIGS. 4, 5, 6a, 6b, 7, 8 and 9). For that, the IP camera 141 sends a message 1130 to the Coax terminal adapter 143.

Message 1130 contains the following information:
- A message ID 1131 identifying the message 1130. On receiving this message 1130, the Coax terminal adapter 143 is aware that it is immunized against a later physical reset; and
- A Reset Timing Info 1132 indicating the duration of the time period during which the Coax terminal adapter 143 is immunized against a later physical reset.

The invention claimed is:

1. A method for resetting at least one processing device in a power-over-data linear bus interconnecting a plurality of processing devices, each processing device among the plurality of processing devices being connected to a same switch port, the method comprising, at a first processing device of said plurality of processing devices:
sending a protocol data unit comprising a prior-reset notification to all other processing devices of the plurality of processing devices, and
sending a physical reset signal to all other processing devices of the plurality of processing devices,
wherein the prior-reset notification is configured to prevent a processing device that receives the physical reset signal from resetting, if the protocol data unit comprising the prior-reset notification has been previously processed by the processing device that received the physical reset signal.

2. The method for resetting at least one processing device according to claim 1, comprising checking a status of each of the processing devices of the plurality of processing devices, the status being either a normally functioning status or a faulty status, and when at least a processing device is verified as having faulty status, selecting the first processing device.

3. The method for resetting at least one processing device according to claim 2, wherein the first processing device is selected from among the processing devices that are directly connected to one processing device verified as having a faulty status.

4. The method for resetting at least one processing device according to claim 2, wherein the first processing device is selected as being the closest processing device connected to one processing device verified as having a faulty status.

5. The method for resetting at least one processing device according to claim 1, further comprising the first processing device receiving from a central controlling device a request to send said protocol data unit comprising a prior-reset notification.

6. The method for resetting at least one processing device according to claim 1, wherein said protocol data unit comprises a Medium Access Control (MAC) level reset notification.

7. The method for resetting at least one processing device according to claim 1, wherein, for a processing device that has processed said protocol data unit, the method comprises deactivating a local reset circuit on receiving a physical reset signal.

8. The method for resetting at least one processing device according to claim 1, wherein, for a processing device that has processed said protocol data unit, the method comprises activating a capacitive circuit on receiving a physical reset signal.

9. A system comprising a plurality of processing devices interconnected by a power-over-data linear bus, each processing device among the plurality of processing devices being connected to a same switch port, wherein a first processing device of said plurality of processing devices is configured for:
sending a protocol data unit comprising a prior-reset notification to all other processing devices of the plurality of processing devices, and
sending a physical reset signal to all other processing devices of the plurality of processing devices,
wherein the prior-reset notification is configured to prevent a processing device that receives the physical reset signal from resetting, if the protocol data unit comprising the prior-reset notification has been previously processed by the processing device that received the physical reset signal.

10. The system according to claim 9, comprising a second processing device configured for checking a status of each of the processing devices of the plurality of processing devices, the status being either a normally functioning status or a faulty status, and a third processing device configured for selecting the first processing device, when at least a processing device is verified as having faulty status, wherein the second device is the first processing device or a processing device among the plurality of processing devices distinct from the first processing, wherein the third device is the first processing device, the second processing device, or a processing device among the plurality of processing devices distinct from both the first processing device and the second processing device.

11. The system according to claim 10, wherein the third device is configured for selecting the first processing devices from among the processing devices that are directly connected to one processing device verified as having a faulty status.

12. The system according to claim 10, wherein the third device is configured for selecting the first processing device as being the closest processing device connected to one processing device verified as having a faulty status.

13. The system according to claim 9, wherein the first processing device is further configured for receiving, from a central controlling device, a request to send said protocol data unit comprising a prior-reset notification.

14. The system according to claim 9, wherein a processing device that has been processed said protocol data unit is configured for deactivating a local reset circuit on receiving a physical reset signal.

15. The system according to claim 9, wherein a processing device that has been processed said protocol data unit is configured for activating a capacitive circuit on receiving a physical reset signal.

16. The system according to claim 9, wherein said first processing device is one of a Power sourcing equipment (PSE), a video monitoring system (VMS), a camera device and adapter device.

17. A non-transitory computer-readable storage medium storing instructions of a computer program for implementing a method for resetting at least a processing device according to claim 1.

* * * * *